United States Patent
Sehrawat

(10) Patent No.: US 12,407,501 B1
(45) Date of Patent: *Sep. 2, 2025

(54) BROADCAST-FREE THRESHOLD POST-QUANTUM KEY GENERATION AND VERIFICATION OVER UNENCRYPTED CHANNELS FROM HARDWARE-BASED CORRELATED RANDOMNESS

(71) Applicant: Circle Internet Group, Inc., New York, NY (US)

(72) Inventor: Vipin Singh Sehrawat, Fremont, CA (US)

(73) Assignee: Circle Internet Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/745,240

(22) Filed: Jun. 17, 2024

Related U.S. Application Data

(63) Continuation of application No. 18/585,936, filed on Feb. 23, 2024, now Pat. No. 12,052,355.

(51) Int. Cl.
*H04L 9/08* (2006.01)
*H04L 9/32* (2006.01)

(52) U.S. Cl.
CPC .......... *H04L 9/0866* (2013.01); *H04L 9/0825* (2013.01); *H04L 9/3278* (2013.01)

(58) Field of Classification Search
CPC .... H04L 9/0866; H04L 9/0825; H04L 9/3278
See application file for complete search history.

(56) References Cited

U.S. PATENT DOCUMENTS

| | | | |
|---|---|---|---|
| 12,052,355 B1 | 7/2024 | Sehrawat | |
| 2019/0342105 A1* | 11/2019 | Adams | H04L 9/0822 |
| 2021/0036873 A1* | 2/2021 | Kim | H04L 9/3278 |

OTHER PUBLICATIONS

Pietrzak, Krzysztof. "Cryptography from learning parity with noise." International Conference on Current Trends in Theory and Practice of Computer Science. Berlin, Heidelberg: Springer Berlin Heidelberg, 2012. (Year: 2012).*

Brakerski et al., "Worst-Case Hardness for LPN and Cryptographic Hashing via Code Smoothing," Presented at the Proceedings of the International Association for Cryptologic Research, Darmstadt, Hesse, Germany, May 19-23, 2019, 1-16.

(Continued)

*Primary Examiner* — Sangseok Park
(74) *Attorney, Agent, or Firm* — Fish & Richardson P.C.

(57) ABSTRACT

Methods, systems, and apparatus for generating an encryption key. In one aspect, a method includes the generating and sending, by a first device, a stream of random challenges to other devices. Each other device processes, by a physically unclonable function (PUF) included in the device, the stream of random challenges twice to obtain pairs of responses and computes a first Bernoulli matrix vector. Each other device generates a first LPN instance using a pre-stored public matrix, a partial encryption key, and the first Bernoulli error matrix, and sends the first LPN instance to the first device. The first device computes a threshold number of the first LPN instances and an estimated combined error of PUFs included in the other devices. The first device generates an encryption key by recovering a summation of each partial encryption key encoded in the threshold number of first LPN instances.

20 Claims, 7 Drawing Sheets

(56) References Cited

OTHER PUBLICATIONS

Carrier et al., "Statistical Decoding 2.0: Reducing Decoding to LPN," CoRR, Submitted on Oct. 17, 2022, arVix:2208.02201, 33 pages.
Doosti et al., "On the connection between quantum pseudorandomness and quantum hardware assumptions," Quantum Science and Technology, Apr. 29, 2022, 7(3):1-24.
Lim, "Extracting Secret Keys from Integrated Circuits," Massachusetts Insitute of Technology, Jun. 2004, 1-119.
Pietrzak, "Cryptography from Learning Parity with Noise", SOFSEM 2012: Theory and Practice of Computer Science, pp. 99-114 (Year: 2012).
Ravikanth et al., "Physical One-Way Functions," Massachusetts Institute of Technology, Jun. 2001, 297(5589):2026-2030.
Regev, "On Lattices, Learning with Errors, Random Linear Codes, and Cryptography," Journal of the ACM, May 2005, 1-37.
Sehrawat et al., "Star-Specific Key-Homomorphic PRFs From Learning With Linear Regression," IEEE Xplore, Jul. 2023, 11:73235-73267.
Van Dijk et al., "A Theoretical Framework for the Analysis of Physical Unclonable Function Interfaces and Its Relation to the Random Oracle Model," Journal of Cryptology, 36(35):1-64.

\* cited by examiner

BROADCAST-FREE THRESHOLD POST-QUANTUM KEY GENERATION AND VERIFICATION OVER UNENCRYPTED CHANNELS FROM HARDWARE-BASED CORRELATED RANDOMNESS

CROSS-REFERENCE TO RELATED APPLICATION(S)

This application is a continuation of and claims the benefit of priority to U.S. patent application Ser. No. 18/585,936, filed Feb. 23, 2024, the contents of which are hereby incorporated by reference.

TECHNICAL FIELD

This specification generally relates to methods, systems, and devices for cryptographic key generation.

BACKGROUND

In some key generation protocols over unencrypted channels, each device of multiple devices generates a partial key without any online communication with the other devices. Then, each device sends a single message to an entity, referred to as a combiner, that combines the individual contributions to generate a new encryption key. Key generation is an important problem in cryptography that can be applied to several real-world applications such as crypto wallets. Furthermore, verifying the correctness of keys is also important since communications can be controlled by a physical messenger.

Existing non-interactive key generation protocols require at least one of the following features: encrypted communication channels with dedicated cryptographic commitment to each contribution, (echo) broadcast communication, an assumption that all parties are honest and their mutual communications are always encrypted, broadcast communication with (non-interactive) zero knowledge proofs, or complete reliance on back and forth zero-knowledge proofs to verify the consistency of the generated key with the supplied shares. Existing key generation protocols with verification over unencrypted or unprotected channels are vulnerable to quantum attacks, making them unsuitable for the imminent quantum era.

SUMMARY

This specification describes systems and methods for efficient broadcast-free threshold post-quantum secure encryption key generation and verification over unencrypted communication channels using hardware-based correlated randomness.

In general, innovative aspects of the subject matter described in this specification can include actions for generating an encryption key, the actions including generating, by a first device, a stream of random challenges; sending, from the first device and through a messenger, the stream of random challenges to a plurality of other devices; for each device of the plurality of other devices: processing, by a physically unclonable function (PUF) included in the device, the stream of random challenges twice to obtain pairs of responses to the challenges in the stream of random challenges, computing a first Bernoulli matrix vector using the pairs of responses, generating a first learning parity with noise (LPN) instance using a pre-stored public matrix, a partial encryption key generated by the device, and the first Bernoulli error matrix, and sending, from the device and through the messenger, the first LPN instance to the first device; combining, by the first device, a threshold number of the first LPN instances received from the plurality of other devices and computing an estimated combined error of physically unclonable functions (PUFs) included in the plurality of other devices; and generating, by the first device, the encryption key, comprising computing a difference between the combined threshold number of first LPN instances received from the plurality of other devices and the estimated combined error of the PUFs included in the plurality of other devices to recover a summation of each partial encryption key encoded in the threshold number of first LPN instances.

Other implementations of this aspect include corresponding systems, apparatus, and computer programs, configured to perform the actions of the methods, encoded on computer storage devices.

These and other implementations can each optionally include one or more of the following features, alone or in combination: the first device and plurality of other devices comprise offline devices; the stream of random challenges is sent from the first device to the plurality of other devices through an unencrypted channel; the first LPN instances are sent to the first device from each device of the plurality of other devices through the unencrypted channel; and the unencrypted channel is controlled by the messenger; the messenger comprises a malicious messenger that colludes with b devices of the plurality of other devices, wherein b is strictly less than the total number of devices; computing the first Bernoulli error matrix using the pairs of responses comprises, for each prime number in a set of prime numbers generated by the device during an online setup process, and for a j-th challenge in the stream of random challenges, computing a difference between the pair of responses to the j-th challenge in the stream of random challenges modulo the prime number; generating the first LPN instance comprises multiplying the public matrix by the partial encryption key and adding the first Bernoulli error matrix; actions further include generating, by the device, the partial encryption key using a set of prime numbers generated by the device during an online setup process and a parameter known to each of the plurality of other devices; computing the estimated combined error of the physically unclonable functions included in the plurality of other devices comprises: providing the stream of random challenges as input to each of two regression models to obtain two streams of predicted outputs for the random challenges, wherein each of the two regression models have been trained on training data during an online setup process to fit challenge-response pairs obtained using the PUFs included in the plurality of other devices as a linear function; and computing the estimated combined error of the PUFs included in the plurality of other devices as a difference between the two streams of predicted outputs; actions further include implementing the online setup process, comprising: generating the training data, comprising: generating, by the first device, multiple streams of random challenges, sending, by the first device, the multiple streams of random challenges to the plurality of other devices, processing, by each device of the plurality of other devices, the multiple streams of random challenges twice using the physically unclonable function included in the device to obtain two responses to each challenge in the multiple streams of random challenges, and providing, by each device of the plurality of other devices and to the first device, the two responses to each challenge in the multiple streams of random challenges as training data; and training, by the first device, the two regression models on the training data; actions further include sending, from the first device, the public matrix to each device in the plurality of other devices, wherein each device of the plurality of other devices stores the public matrix; generating the multiple streams of random challenges comprises using a pseudorandom generator included in the first device; each stream of random challenges in the multiple streams of random challenges comprises a predetermined proportion of meta-stable challenge bits; or the streams of random challenges comprise an equal number of meta-challenges; recovering the summation of each partial encryption key encoded in the threshold number of first LPN instances comprises performing a trapdoor inversion algorithm; actions further include determining, by the first device, to share the encryption key with another device in the plurality of other devices; computing, by the first device, a modified LPN instance using the first LPN instance received from the other device, the public matrix, and the encryption key; sending, by the first device, the modified LPN instance to the other device; processing, by the PUF included in the other device, the stream of random challenges twice to obtain a second Bernoulli error matrix; generating a second LPN instance using the public matrix, the partial encryption key, and the second Bernoulli error matrix; and computing a difference between the modified LPN instance and the second LPN instance to recover the encryption key; a difference between the first Bernoulli error matrix and the second Bernoulli error matrix has a low Hamming weight; actions further include verifying the recovered encryption key, the verifying comprising one or more of: verifying that the recovered encryption key is singular; or verifying that the recovered encryption key was generated using inputs from the first device; actions further include generating the stream of random challenges comprises using a first device PUF or a pseudorandom generator; the stream of random challenges comprises highly-stable and meta-stable challenges; and an entropy of an output of the stream of random challenges and a threshold challenge length for the stream of random challenges satisfy pre-defined levels; the PUFs included in the plurality of other devices comprise strong implicit physically unclonable functions; actions further include verifying the encryption key, comprising: computing a modulo of the encryption key with respect to a value r−1, wherein r represents a sum of sizes of sets of prime numbers generated by the plurality of other devices during an online setup process; and determining that a determinant of the modulo of the encryption key with respect to a value r−1 is equal to zero.

Some implementations of the subject matter described herein may realize, in certain instances, one or more of the following advantages.

In cold storage settings (e.g., settings where devices are not connected to any network), broadcast channels and encrypted communications cannot be guaranteed. This is because each message sent between devices and the combiner needs to be sent through a potentially malicious physical messenger, making broadcast impossible. If the messenger colludes with malicious/compromised devices, then the messenger can easily get the encryption keys used to secure the communications. Trusted execution environments such as Intel SGX could be used in such settings, but even these can be compromised by a party with physical access to a device. Since cold storage is a common practice in cryptocurrency, it becomes imperative to design key generation and verification protocols that do not assume broadcast communications over encrypted channels. Furthermore, due to the imminent threat of quantum computers, the scheme must be post-quantum (i.e., secure against quantum attacks).

The key generation and key sharing protocols described in this specification provide a solution to the above-described problems. For example, the presently described key generation and key sharing protocols use physically unclonable functions (PUFs) to enable correlated randomness on a set of offline devices. This correlated randomness allows the devices to generate learning parity with noise (LPN) instances that are post-quantum secure. The LPN instances can be sent to a central combiner that can combine the contributions received from the individual devices to generate a new key.

Since the LPN instances are sent over to a single party, no broadcast channel is required for the protocol. This provides broadcast-free, threshold post-quantum key generation with efficient verification over unencrypted channels from hardware-based correlated randomness. Further, since the (safe) primes for a threshold T or more devices are not exposed in any manner, data security is guaranteed due to the computational hardness of LPN. In addition, the protocols are extremely efficient in the offline phase since generating LPN instances only involves linear computations over fixed fields and PUFs are very fast since they are hardware-based functions. Therefore, the presently described protocols offer more robust security guarantees and are much faster than existing solutions for threshold post-quantum key generation with verification over unencrypted/unprotected channels (e.g., solutions that do not generate LPN instances and use PUFs).

The present disclosure also provides a non-transitory computer-readable storage medium coupled to one or more processors and having instructions stored thereon which, when executed by the one or more processors, cause the one or more processors to perform operations in accordance with implementations provided herein.

It is appreciated that the methods and systems in accordance with the present disclosure can include any combination of the aspects and features described herein. That is, methods and systems in accordance with the present disclosure are not limited to the combinations of aspects and features specifically described herein, but also include any combination of the aspects and features provided.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

This specification describes techniques for non-interactive encryption key generation over unencrypted communication channels using hardware-based correlated randomness. In an online setup phase, training data is generated by processing randomly generated challenge streams using physically unclonable functions (PUFs) on a set of devices. The training data is used to train regression models to predict a collective output of the physically unclonable functions on a same input. The predictions can in turn be used to estimate a combined error of the physically unclonable functions. In an offline key generation phase, each device in the set of devices uses errors generated by its physically unclonable function to construct a learning parity with noise instance that encodes a partial encryption key. A combiner decodes the learning parity with noise (LPN) instances received from the set of devices using the trained regression models to recover the partial encryption keys and generate a final encryption key. The combiner can verify the final encryption key by confirming that the final encryption key satisfies expected properties.

In some implementations, actions for generating an encryption key include generating, by a first device, a stream of random challenges; sending, from the first device and through a messenger, the stream of random challenges to a plurality of other devices; for each device of the plurality of other devices: processing, by a physically unclonable function (PUF) included in the device, the stream of random challenges twice to obtain pairs of responses to the challenges in the stream of random challenges, computing a first Bernoulli matrix vector using the pairs of responses, generating a first learning parity with noise (LPN) instance using a pre-stored public matrix, a partial encryption key generated by the device, and the first Bernoulli error matrix, and sending, from the device and through the messenger, the first LPN instance to the first device; combining, by the first device, a threshold number of the first LPN instances received from the plurality of other devices and computing an estimated combined error of physically unclonable functions (PUFs) included in the plurality of other devices; and generating, by the first device, the encryption key, comprising computing a difference between the combined threshold number of first LPN instances received from the plurality of other devices and the estimated combined error of the PUFs included in the plurality of other devices to recover a summation of each partial encryption key encoded in the threshold number of first LPN instances.

Figure 1:
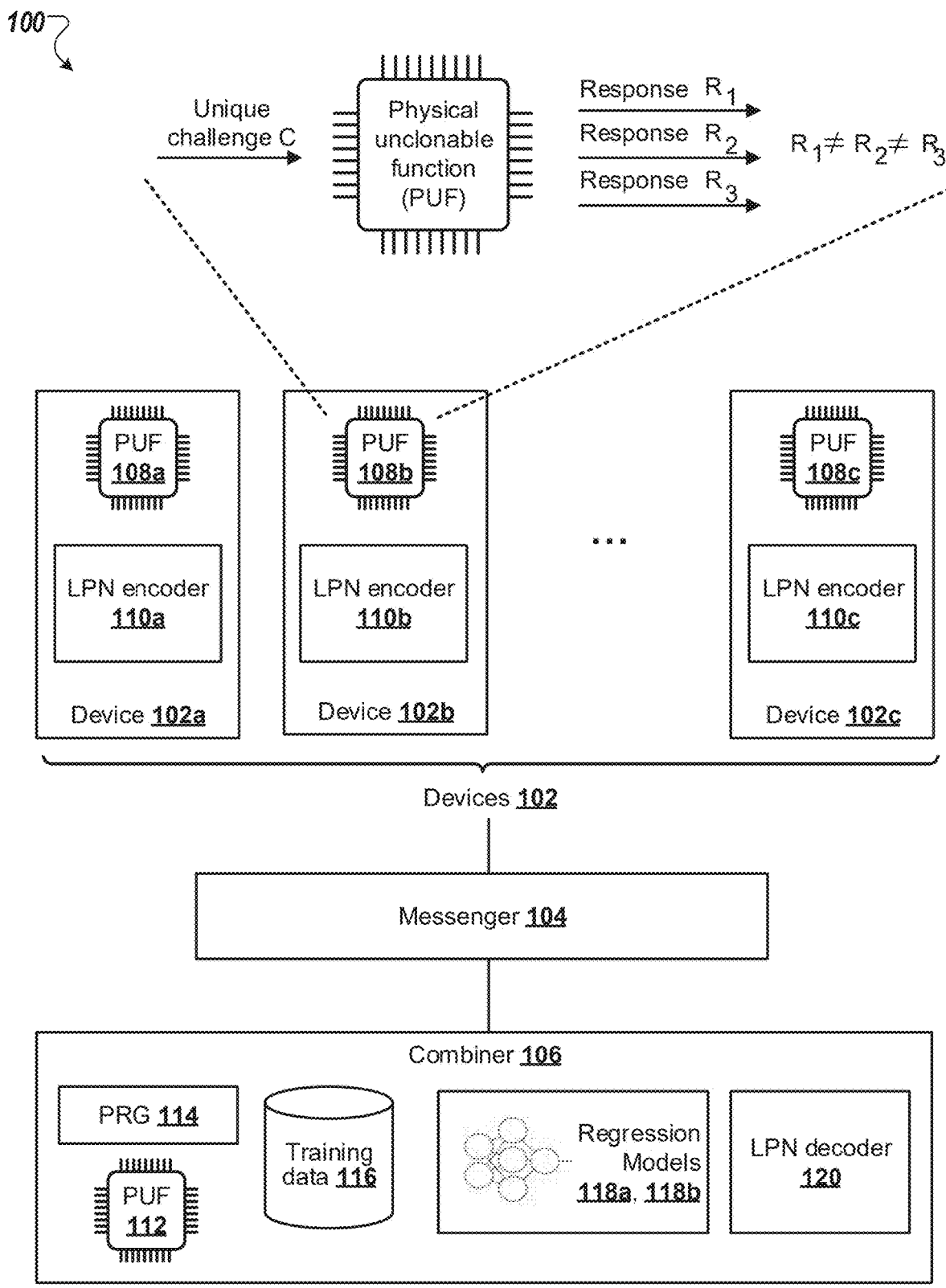
FIG. 1 is a block diagram of an example key generation system.

FIG. 1 is a block diagram of an example key generation system 100. The example key generation system 100 includes multiple devices 102 (e.g., devices 102a-102c) and a combiner 106. For clarity, the example key generation system 100 includes three devices 102a-102c. However, in some implementations the system can include fewer or more devices. In some implementations the components of the example key generation system 100 can "online" and connected over a network (e.g., a local area network (LAN), wide area network (WLAN), the Internet, or a combination thereof). In some implementations the components of the example key generation system 100 can be "offline" and connected using a physical messenger 104.

Each device of the multiple devices 102 is a classical or quantum computing system that can be implemented as computer programs on one or more classical or quantum computers in one or more locations. Each device includes a PUF and a LPN encoder. For example, device 102a includes PUF 108a and LPN encoder 110a, device 102b includes PUF 108b and LPN encoder 110b, etc. The computing components included in each device can be connected over a network (e.g., LAN, WLAN, the Internet, or a combination thereof), which can be accessed over a wired and/or a wireless communications link.

The PUFs 108a-108c are physical classical or quantum entities that are embodied in the physical structure of the respective devices 102a-102c. For example, one or more of the PUFs 108a-108c can be implemented in an electrical circuit of the respective device. When a physical stimulus is applied to a PUF, the PUF reacts due to the interaction of the stimulus with the physical microstructure of the device. The applied stimulus is called a challenge and the reaction of the PUF is called a response. Contrary to standard digital systems, the PUF response depends on unavoidable nanoscale structural disorders in the hardware (e.g., introduced during manufacture), which lead to a response behavior that cannot be cloned or reproduced exactly, not even by the hardware manufacturer. That is, when a same unique challenge C is issued multiple times, the measured responses (e.g., $R_1$, $R_2$, $R_3$) of the same PUF may differ.

A same unique challenge issued to a strong PUF is guaranteed to be pseudorandom, i.e., unpredictable for a probabilistic polynomial time (PPT) adversary. However, for any unique highly-stable challenge, the output is the same with high probability. Hence, in the security model, while the PPT adversary is allowed to issue a polynomial (in terms of a chosen security parameter) number of queries, it is not allowed to issue the same query twice. This is because independence in the outputs for unique inputs is required, so that for unique inputs, a strong PUF remains indistinguishable (to a PPT adversary) from a random function. Therefore, the security game for PUFs is defined in a very similar manner to those used to establish the security of PRFs and PRGs—due to their deterministic nature. However, unlike PRFs and PRGs, PUFs are not fully deterministic—even for highly-stable challenges—which is why the term "with (very) high/low probability" is used when describing PUFs.

A specific challenge and a corresponding response form a so-called challenge-response pair (CRP). The error between a challenge and a response of a PUF at an initial time and subsequent times (i.e., its variations in reproducibility) is referred to as a challenge-response pair (CRP) error. A PUF can be classified as a weak PUF, if the PUF has a small number of challenge-response pairs or generates responses that are not independent but highly correlated. Conversely, a PUF can be classified as a strong PUF, if it has a large number of challenge-response pairs or generates responses that are largely independent or exhibit low correlation, e.g., if x and y are the inputs and outputs of a strong PUF, then for any randomly sampled x (from the domain of the PUF): $Pr[x|y]=Pr[x]-\epsilon$, where $\epsilon \in [0,1)$) and if the value of $\epsilon$ is high (above a predetermined threshold), then the correlation is low and vice-versa. Strong PUFs are generally preferred for cryptographic purposes because they provide more entropy.

A PUF is called an implicit PUF, if it has unintended manufacturing variations as the sole source of its randomness. Conversely, a PUF is called an explicit PUF, if it uses external steps in addition to the manufacturing variations to generate randomness. As described below with reference to FIGS. 2 and 3, in some implementations the PUFs included in example system 100 are strong, implicit PUFs.

The usefulness of a PUF can be measured using two central metrics: reproducibility and uniqueness. Reproducibility is defined as $\delta=|d(PUF_{t_1}(x)-PUF_{t_2}(x))|$, where $|\cdot|$ represents an absolute value, $d(PUF_{t_1}(x)-PUF_{t_2}(x))$ represents the Hamming weight between a PUF's output $PUF_{t_1}(x)$ at time $t_1$ on input x and the PUF's output $PUF_{t_2}(x)$ at time $t_2$ on the same input x. Smaller values of $\delta$ indicate larger reproducibility and vice-versa. The reproducibility $\delta$ of a PUF can be modeled as an independent Bernoulli distributed random variable. Uniqueness is defined as $\Delta=|d(PUF_1(x)-PUF_2(x))|$, where $d(PUF_1(x)-PUF_2(x))$ represents the Hamming distance between an output generated by a first PUF $PUF_1$ on input x and an output generated by a different, second PUF $PUF_2$ on the same input x. The value of $\Delta$ is directly proportional to the uniqueness of the pair of PUFs.

PUFs can run two types of challenges: highly-stable challenges and meta-stable challenges. Highly-stable challenges are challenges with responses that follow an almost static pseudorandom mapping. Hence, highly-stable challenges have low $\delta$ values and high reproducibility with standard error correction. Meta-stable challenges are challenges with responses that have a non-static distribution with 50% variation. Therefore, the responses to meta-stable challenges are random, giving them high $\delta$ value and low reproducibility. As described below with reference to FIGS. 2 and 3, in some implementations the PUFs included in example system 100 are configured to process streams of challenges that include both highly-stable and meta-stable challenges.

The devices 102a-c are configured to use the respective PUFs 108a-c to process streams of challenges (e.g., received from the combiner 106) to generate corresponding CRPs. In some implementations, the devices 102a-c are configured to provide the CRPs to the combiner 106 as training data. In some implementations, the devices 102a-c are configured to compute CRP errors using the CRPs and provide the computed CRP errors to respective LPN encoders 110a-c. Example operations performed using the PUFs 108a-c are described in more detail below with reference to FIGS. 2-4.

The LPN encoders 110a-c are configured to use CRP errors to construct LPN instances that encode respective partial secret keys. Generally, an LPN instance can be defined as As+e, where A represents a m×n binary-valued matrix, s represents a binary-valued vector of length n, and e represents a vector of random values (taken from a specific distribution or distributions) of length n. An LPN instance is solved by recovering s. The LPN instances constructed by each LPN encoder in a respective device are defined as As+e, where A represents a m×n binary-valued public matrix that is stored by each device of the multiple devices 102, s represents a partial secret key generated by the respective device, and e represents CRP errors generated by a PUF included in the respective device. That is, e is a vector of values randomly sampled from a Bernoulli distribution $\mathcal{X}_\tau$ over $\mathbb{F}_2^m$ with bias $\tau$. The bias is the probability with which an entry in the vector e is non-zero. Example operations performed by the LPN encoders 110a-c are described in more detail below with reference to FIGS. 3 and 4.

The combiner 106 is a classical or quantum computing system that can be implemented as computer programs on one or more computers in one or more locations. In some implementations the combiner 106 can be semi-honest—it can be assumed that the combiner 106 follows the key generation protocol correctly and can attempt to gain information without deviating from the protocol. The combiner 106 includes a PUF 112, a pseudorandom generator (PRG) 114, a training data store 116, two regression models 118a, 118b, and an LPN decoder 120. These computing components can be connected over a network (e.g., LAN, WLAN, the Internet, or a combination thereof), which can be accessed over a wired and/or a wireless communications link.

The PUF 112 included in the combiner 106 is similar to the PUFs 108a-c included in the devices 102a-c. The PRG 114 is a computer program that generates sequences of numbers with properties that approximate the properties of sequences of random numbers. The combiner 106 is configured to use the PUF 112 and/or PRG 114 to generate streams of random challenges (e.g., as part of an online setup process as described below with reference to FIG. 2; as part of an offline key generation process as described below with reference to FIG. 3).

The training data store 116 is configured to store training data for training the regression models 118a, 118b. The training data includes CRPs generated by the multiple devices 102 (e.g., pairs of CRPs obtained by processing a stream of random challenges twice using respective PUFs). The combiner 106 is configured to train the regression models 118a, 118b on the training data (e.g., train the regression models to fit input CRPs as a linear function). Once trained, the combiner 106 can use the regression models 118a, 118b to predict outputs generated by the PUFs included in the multiple devices 102 on a same given input. These predictions cam be used to estimate a collective response of the PUFs, e.g., using modular addition. Example operations for training the regression models 118a, 118b and using the trained regression models 118a, 118b are described in more detail below with reference to FIGS. 2 and 3.

The LPN decoder 120 is configured to process LPN instances generated by the LPN encoders 110a-c to recover the partial secret keys encoded in the LPN instances and combine the partial secret keys to generate a secret key. Example operations performed by the LPN decoder 120 are described in more detail below with reference to FIG. 3.

The messenger 104 is configured to facilitate communications between the multiple devices 102 and the combiner 106. For example, the messenger 104 is configured to collect streams of random challenges from the combiner 106 and send the streams of random challenges to each device in the multiple devices 102. Further, the messenger 104 is configured to collect LPN instances generated by the multiple devices 102 and return the LPN instances to the combiner 106. In some implementations the messenger 104 can use an unencrypted channel send data between the devices 102 and combiner 106.

Figure 2:
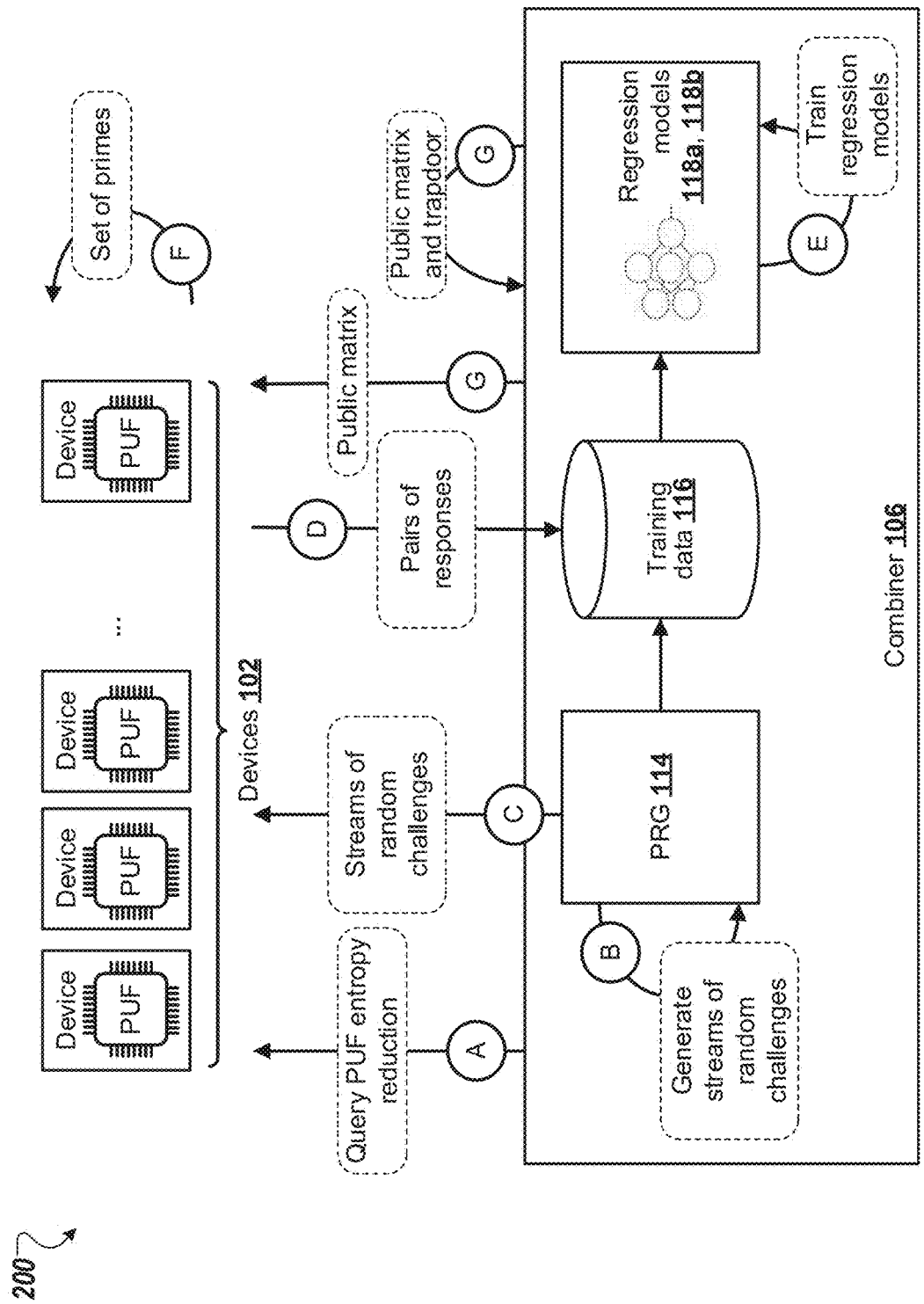
FIG. 2 is a block diagram of an example key generation system during an example online setup process.

FIG. 2 is a block diagram 200 of the example key generation system 100 of FIG. 1 during an example online setup process. The block diagram 200 illustrates the example online setup process as including six stages (A)-(F). However, in some implementations the example online setup process can include fewer or more stages.

During stage (A) of the example online setup process, the combiner 106 performs a quality control check of the PUFs included in each device of the multiple devices 102. The combiner 106 analyzes each PUF to obtain information on the entropy reduction between the PUF's input and output.

During stage (B) of the example online setup process, the combiner 106 uses the entropy reduction information obtained during stage (A) to generate multiple different streams of random challenges that each satisfy a predetermined acceptable entropy. For example, if the entropy reduction information indicates that a PUF responds to a t-bit long challenge input with a t-bit long output that has 0.9 entropy of the challenge input, and the predetermined acceptable entropy is 0.9, then the combiner 106 can generate streams of random challenges that include a meta-stable challenge after every t-bits. The value of t is referred to as a threshold challenge length (TCL) since beyond this length, the entropy guarantee for the output drops below the predetermined acceptable entropy. The combiner 106 can use the PRG 114 to generate multiple different streams of random challenges. In some implementations, at least 0.1 of the challenge bits in the streams of random challenges can be meta-stable. That is, the corresponding response bits always have the maximum entropy of 1. Without loss of generality, in some implementations, it can be assumed that, on average, the different streams of random challenges have an equal number of meta-challenges for the PUFs on each device of the multiple devices 102.

During stage (C) of the example online setup process, the combiner 106 sends the different streams of random challenges $C_j$ (for $j \in [R]$, where R represents the number of different streams of challenges generated at stage (B)) to the devices 102.

During stage (D) of the example online setup process, each device of the multiple devices 102 uses its PUF to run the received streams of random challenges twice to generate pairs of responses to the streams of random challenges. Each device of the multiple devices 102 then sends the pairs of responses to combiner 106. The total number of responses received by the combiner 106 from each device is therefore 2Rl, where R represents the number of different streams of challenges generated at stage (B) and l represents the number of devices. The combiner 106 stores corresponding CRPs as training data in the training data store 116.

During stage (E) of the example online setup process, the combiner 106 trains two regression models 118a, 118b using the training data in the training data store 116. The combiner 106 trains a first regression model 118a on one of the set of responses received during stage (D), e.g., by fitting CRPs in the training data store 116 that correspond to one of the sets of Rl responses as a linear function. Once trained, the first regression model 118a can then be used to process an input that specifies a particular challenge and generate as out output a predicted collective response generated by the device PUFs. The collective response can be computed through application of a modular addition operation to predicted responses generated by each individual device PUF. Similarly, the combiner 106 trains a second regression model 118b on the other set of responses received during stage (D), e.g., by fitting CRPs in the training data store 116 that correspond to the other set of $R_l$ responses as a linear function. Once trained, the second regression model 118b can also be used to process an input that specifies a particular challenge and generate as out output a predicted collective response generated by the device PUFs. Since the deviations in the outputs of a strong PUF (for a same input) follow a Bernoulli distribution, it follows that $|\mathcal{M}(x) - \mathcal{M}'(x)| \in \mathcal{X}$ for a Bernoulli distribution $\mathcal{X}$ with bias $\tau \leq \tau_i$ ($i \in [l]$) where $\mathcal{M}(x)$ represents an output of the first regression model on input x, $\mathcal{M}'(x)$ represents an output of the second regression model on the same input x, and $\tau_i$ represents a bias for the Bernoulli distribution that models the errors generated by the PUF included in device i ($PUF_i$) and is given by $|PUF_i^{(z)}(x) - PUF_i^{(j)}(x)|$, where $PUF_i^{(z)}(x)$ represents the output of $PUF_i$ for a z-th iteration.

During stage (F) of the example online setup process, each device of the multiple devices 102 generates a respective set of randomly sampled primes $\mathcal{P}_i = \{p_j^{(i)}\}_{j \in [u]}$. The number of primes u included in each set is determined in advance and known to all of the devices (and the combiner). Further, each prime included in each set is at most f digits long, where f is a predetermined threshold that is known to all of the devices (and the combiner). It can be assumed that honest parties generate sufficiently large primes to avoid successful guessing by a classical or quantum PPT adversary. In some implementations the primes can be safe primes, e.g., primes that have the form p=2q+1 where q is prime.

During stage (G) of the example online setup process, the combiner 106 generates a random prime p using the predetermined values u and f such that $|p|=f \cdot u \cdot l+1$, where $|p|$ represents the size of p in any base, e.g., the number of digits (base b>2) or the number of bits (base 2). The combiner 106 also generates a public matrix $A \leftarrow \{0,1\}^{m \times n}$ along with a trapdoor of A. A trapdoor function can be defined as follows. Let $n \geq wd$ be an integer and $\bar{n}=n-wd$. For $A \in \mathbb{Z}_q^{w \times n}$, it is said that $R \in \mathbb{Z}_q^{\bar{n} \times wd}$ is a trapdoor for A with tag $H \in \mathbb{Z}_q^{w \times w}$ if $$A \begin{bmatrix} R \\ \mathbb{I} \end{bmatrix} = H \cdot G,$$

where $G \in \mathbb{Z}_q^{w \times wd}$ is a primitive matrix and the identity matrix $\mathbb{I}$ has dimension wd×wd. Given a trapdoor R for A, and an LWE instance B=AS+E mod q for some "short" error matrix E, LWE inversion algorithms can successfully recover S (and E) with large probability. LWE problems are considered a generalization of LPN (although the former is a lattice problem and the latter is a decoding problem that requires decoding a random linear code over $\mathbb{F}_2$). LWE requires Gaussian errors and LPN uses Bernoulli errors. However, instantiating a LWE with modulus 2 and a zero-heavy error distribution (e.g., a quite narrow discrete Gaussian) yields LPN as a zero-heavy error distribution that tends to be arbitrarily close to Bernoulli. Therefore, trapdoor algorithms that are used for LWE problems can also be used for inverting LPN instances too (even though LPN is not a lattice problem). The dimension of the public matrix satisfies $m \geq f-1$ and $n \geq m$. The combiner 106 sends the public matrix to each of the multiple devices and stores the trapdoor. Each device of the multiple devices 102 stores the received public matrix for use in a future offline key generation process.

It is noted that the size of the random prime p generated by the combiner 106 during stage (G) enables trapdoor inversion—the Euclidean norm of the error cannot be greater than p/4 for the trapdoor inversion to work correctly. Therefore, $$\frac{ufT}{2} < \frac{ful}{4}; \Longrightarrow T < \frac{l+1}{2}.$$

Therefore, the threshold T (described in more detail below with reference to the key generation process) directly depends on the size of the random prime p and can be controlled by the combiner 106. However, since the combiner 106 can be assumed to be semi-honest, the combiner can be trusted to adjust the threshold T via the size of the random prime p according to the state of the multiple devices.

Figure 3:
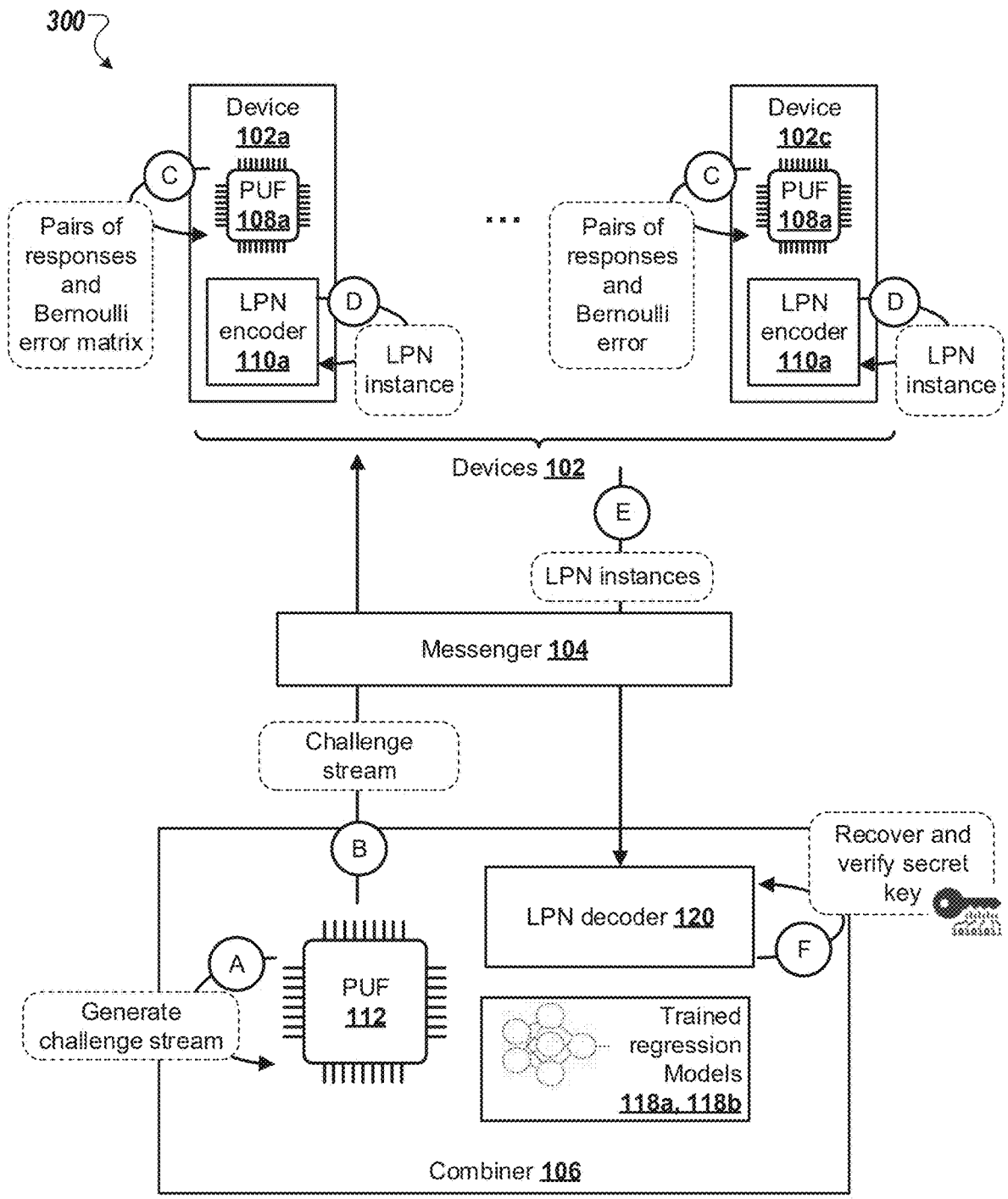
FIG. 3 is a block diagram of an example key generation system during an example offline key generation process.

FIG. 3 is a block diagram 300 of the example key generation system 100 of FIG. 1 during an example offline key generation process. The block diagram 300 illustrates the example offline key generation process as including six stages (A)-(F). However, in some implementations the example offline key generation process can include fewer or more stages.

During stage (A) of the example offline key generation process, the combiner 106 initiates key generation. To initiate key generation, the combiner 106 generates a stream of challenges (also referred to as a challenge stream) using a mix of highly-stable and meta-stable challenges, such that the entropy of the output and TCL remain at target levels (as described above with reference to stage (B) of the online setup process). In the below description, the generated stream of challenges is referred to as a. In some implementations the combiner 106 can use a PUF 112 to generate the challenge stream. In some implementations, the combiner 106 can use a PRG 114 to generate the challenge stream.

During stage (B) of the example offline key generation process, the combiner 106 sends the challenge stream α to each device of the multiple devices 102. The combiner 106 can send the challenge stream in an unencrypted form through messenger 104. The messenger 104 can be a malicious messenger.

During stage (C) of the example offline key generation process, each device of the multiple devices 102 receives the challenge stream α and uses each bit of the challenge stream α twice to generate pairs of responses. Each device then uses the generated pairs of responses to compute corresponding Bernoulli errors. For example, device i can use its PUF ($PUF_i$) to generate pairs of responses $PUF_i^{(1)}(\alpha[j])$, $PUF_i^{(2)}(\alpha[j])$ to the challenge stream α, where j indexes the number of bits in the challenge stream. The device can then use the pairs of responses to compute corresponding Bernoulli errors $e_i[j]$. The Bernoulli error can be computed as:

$$e_i[j] = PUF_i^{(1)}(\alpha[j]) - PUF_i^{(2)}(\alpha[j]) \bmod p_i \quad (1)$$

where $p_i$ is any one of the u randomly sampled (safe) primes that device i generated during the setup phase and $e_i[j]$ represents the j-th element of vector $e_i$. That is, during stage (C) device i uses its PUF ($PUF_i$) to generate a random |α|-bit Bernoulli error vector, $e_i$. Each device can repeat this procedure over the primes in the set of u primes to generate a matrix $E_i$. The matrix $E_i$ belongs to a Bernoulli distribution and is referred to as a Bernoulli error matrix. The dimensions of $E_i$ can be adjusted by adjusting the length of the challenge stream |α|.

During stage (D) of the example offline key generation process, each device of the multiple devices 102 generates an LPN instance using the public matrix received during stage (F) of the example online setup process, a partial key generated by the device, and the Bernoulli error matrix computed during stage (C). The partial key generated by device i is a matrix $S_i$ that can be computed as $S_i = \sum_{\hat{p}_i \in \hat{\mathcal{P}}_i} S_{\hat{p}_i}$ where $\hat{\mathcal{P}}_i \subseteq \mathcal{P}_i$ is a set of all primes from $\mathcal{P}_i$ (generated by device i during the setup process) for which it holds that $$\left(\frac{d}{\hat{p}_i}\right) = 1.$$

The value d is a quadratic residue in $\mathbb{Z}_{\hat{p}_i}$ and is known to each device of the multiple devices. For example, the value of d can round specific, e.g., be equal to the key generation round number, i.e., the number of times key generation has taken place plus one. The quantity $$S_{\hat{p}_i} = \left(s_{z,j}^{(\hat{p}_i)}\right)_{1 \leq y, j \leq (\hat{p}_i - 1)/2} \text{ with } s_{z,j}^{(\hat{p}_i)} = \left(\frac{z^2 + d_j^2}{\hat{p}_i}\right).$$

The LPN instance can then be given by:

$$\zeta_i = AS_i + E_i, \quad (2)$$

where A represents the public matrix, $S_i$ represents the partial key, and $E_i$ represents the Bernoulli error matrix. Each device can also compute the determinant of $S_{\hat{p}_i}$, $$\det(S_{\hat{p}_i}) = S(d, \hat{p}_i) = \det\left[\left(\frac{z^2 + d_j^2}{\hat{p}_i}\right)\right]_{1 \leq y, j \leq (\hat{p}_i - 1)/2}$$

for each $\hat{p}_i \in \hat{\mathcal{P}}_i$.

During stage (E) of the example offline key generation process, the messenger 104 collects the LPN instances $\zeta_i$ from devices of the multiple devices. In some implementations the messenger 104 can also collect the size $|\hat{\mathcal{P}}_i|$ of the set of primes $\hat{\mathcal{P}}_{i,i}$ used to generate the partial key, and the set of determinants $\{S(d,\hat{p}_i)\}_{s(d,\hat{p}_i)}$ from the devices of the multiple devices, e.g., in implementations where the combiner verifies the secret key recovered during stage (F), as described in more detail below. For any prime p, the number of quadratic residues (QRs) is (p−1)/2 (in $\mathbb{Z}_p$). Therefore, not all elements in $\mathbb{Z}_p$ are QRs. This means that a randomly sampled element has ~50% chance of being a QR mod p. Therefore, with high probability $\hat{\mathcal{P}}_{i,i}$ is a proper subset of $\mathcal{P}_i$. It is only with low probability that $\hat{\mathcal{P}}_{i,i}$ is equal to $\mathcal{P}_i$. Therefore, $|\hat{\mathcal{P}}_{i,i}|=u$ only holds with probability $$\left(\frac{1}{2}\right)^u.$$

In some implementations, the messenger 104 can collect the LPN instances from the multiple devices in turn (e.g., collect LPN instance $\zeta_i$ from device $d_i$ before moving on to the next device). Once the messenger 104 has collected at least a threshold T LPN instances (i.e., has visited at least T devices), the messenger returns the LPN instances to the combiner 106. It is noted that the messenger 104 visits each device only once.

During stage (F) of the example offline key generation process, the combiner 106 uses the LPN instances to recover the secret key. First, the combiner 106 combines the LPN instances, for example, computing:

$$\kappa = \sum_{i=1}^{T} \zeta_i. \quad (3)$$

where it can be shown that the right-hand side of Eq. (3) is equal to the right hand side of Eq. (4) below:

$$\kappa = \sum_{i=1}^{T} \zeta_i = A \sum_{i=1}^{T} S_i + \sum_{i=1}^{T} E_i. \quad (4)$$

The combiner 106 provides the challenge stream α generated during stage (A) as input to each of the regression models 118a, 118b trained during stage (E) of the example online setup process to obtain two outputs. The combiner 106 then computes a difference of the outputs to obtain an estimated combined error $\bar{E}$ of all l PUFs included in the multiple devices 102. It follows directly that $\bar{E}=\Sigma_{i=1}^{T}E_i-E$ has low Hamming weight. Therefore, to recover the secret key, the combiner 106 can compute a difference of the combined LPN instances κ and the estimated combined error $\bar{E}$ and use this quantity to solve for the secret key. That is, the combiner 106 solves:

$$\kappa - \bar{E} = A\sum_{i=1}^{T} S_i + \hat{E} \bmod p \qquad (5)$$

for the secret key $S=\Sigma_{i=1}^{l}S$, e.g., using a trapdoor inversion algorithm.

In some implementations the combiner 106 can also verify the secret key S obtained during stage (F), e.g., verify that the secret key has expected properties. For example, the combiner 106 can compute $\hat{S}=S \bmod(r-1)$ where $r=\Sigma_{i \in [T]}|\mathcal{P}_i|$ and £ is the Minkowski sum of all $\mathcal{P}_i$, i.e., |£|=r. Since S is a summation of the Legendre symbols with respect to r (safe) primes, an element a is a quadratic residue in $\mathbb{Z}_m$ for $m=\Pi_{p_i \in £}p_i$ if and only if a is a quadratic residue modulo all primes in £. Therefore, henceforth, $p_i$ refers to a member of £. Hence, reducing the sum of all matrices to mod(r–1) ensures that the 1 entries indicate true quadratic residues mod m. Then, the combiner 106 verifies that the determinant of $\hat{S}$ is equal to zero. This establishes that the secret key has the expected properties. The combiner 106 does not need to know £, m or anything about m's prime factors to perform this verification.

It can be verified that the example offline key generation process is a broadcast-free, post-quantum, threshold key generation and verification protocol that allows the combiner 106 to generate the secret key s without leaking any non-negligible information to a (classical or quantum) probabilistic polynomial time (PPT) messenger 104. This is because, in order to do so, the messenger 104 would have to solve a LPN problem, which is a computationally hard problem for classical and quantum machines. Furthermore, it follows from one-time pad that the secrecy of the secret key s is not compromised, if less than or equal to T–1 devices of the C devices collude with the messenger 104. Further, the security is not weakened if the communication channels are unencrypted.

Figure 4:
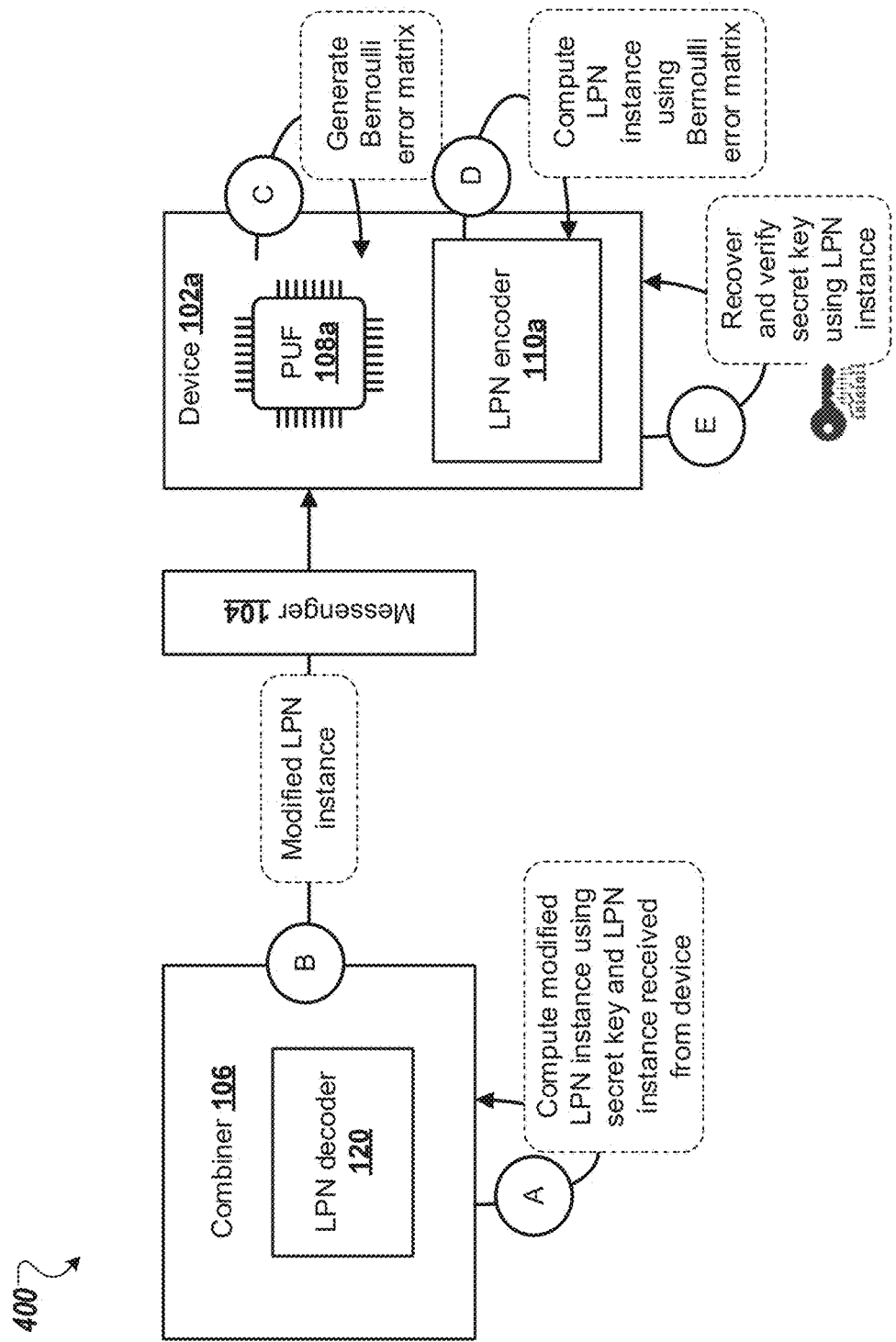
FIG. 4 is a block diagram of an example key generation system during an example key sharing process.

FIG. 4 is a block diagram 400 of the combiner 106 of FIG. 1 during an example key sharing process. The block diagram 400 illustrates the example key sharing process as including five stages (A)-(E). However, in some implementations, the example key sharing process can include fewer or more stages. Further, the block diagram 400 illustrates the combiner 106 sharing a secret key with one device 102a. However, the example key sharing process could be used to share a secret key with different devices and/or more than one device of the multiple devices.

During stage (A) of the example key sharing process, the combiner 106 computes a modified LPN instance using a secret key generated during the offline key generation process and an LPN instance received from the device 102a during stage (E) of the offline key generation process. The modified LPN instance is equal to the LPN instance received from the device 102a added to a matrix product of the public matrix generated by the combiner 106 during the online setup process and the secret key. That is, the combiner 106 computes:

$$\gamma_i = \zeta_i + AS \qquad (6)$$

where $\zeta_i$ represents the LPN instance received from the device, A represents the public matrix, and S represents the secret key. It can be shown that the right-hand side of Eq. (6) is equal to the right-hand side of Eq. (7) below:

$$\gamma_i = \zeta_i + AS = A(S + S_i) + E_i \qquad (7)$$

where $S_i$ represents the partial key generated by the device, and $E_i$ represents the Bernoulli error matrix generated by the device 102a.

The combiner 106 also computes the quantity given below $$\xi = \prod_{p_\square \in £} S(d, p_i) = \frac{\prod_{p_i \in £} T(d, p_i)}{\phi(m)} = \frac{\prod_{p_i \in £} T(d, p_i)}{\prod_{i \in [r]} q_i} \qquad (8)$$

for odd primes $q_i$ ($i \in [r]$), where $\phi(m)$ represents Eulers totient function, $$S(d, p_i) := \det\left[\left(\frac{i^2 + dj^2}{p_i}\right)\right]_{1 \le i,j \le (m-1)/2} \text{ and}$$

$$T(d, p_i) := \det\left[\left(\frac{i^2 + dj^2}{p_i}\right)\right]_{0 \le i,j \le (m-1)/2}, \text{ where } \left(\frac{a}{p}\right)$$

represents a Legendre symbol of a for prime p. This follows from the fact that each $p_i$ is a safe prime. This quantity enables the device 102a to verify that the shared key was generated using their inputs and the combiner did not share a random key with them. In particular, computing ξ as given above means that if and only if the combiner was honest and used only the inputs from the devices, then it gets to $$\frac{\prod_{p_\square \in £} T(d, p_i)}{\prod_{i \in [r]} q_i}$$

by computing $\Pi_{p_\square \in £}S(d,p_i)$. This follows from the relationship between S(d,p) and T(d,p) (namely that $$S(d, p) = \frac{2}{p-1} T(d, p) \text{ when } \left(\frac{d}{p}\right) = 1).$$

Since only device $d_i$ knows $q_i$—from $p_i=2q_i+1$—and because the $q_i$ are prime, they can verify the combiner's honesty by verifying that the greatest common divisor of ξ and $\phi(p_i)$ (=$2q_i$) is $q_i$, establishing that their primes were indeed used to generate the key.

During stage (B) of the example key sharing process, the combiner 106 sends the modified LPN instance and the quantity ξ to the device 102*a* (e.g., using the messenger 104). During stage (C) of the example key sharing process, the device 102*a* receives the modified LPN instance and, in response, uses its PUF to process the challenge stream α generated during the example offline key generation process twice and obtain corresponding challenge response pairs. The device 102*a* uses the challenge response pairs to compute a Bernoullli error matrix $\tilde{E}_i$, as described above with reference to stage (C) of the key generation process. It follows from the reproducibility of the PUFs that $E_i^* = |E_i - \tilde{E}_i|$ has a low Hamming weight (<<τw) and low Euclidean and infinity norms.

During stage (D) of the example key sharing process, the device 102*a* computes an LPN instance using the public matrix, the partial key generated during the offline key generation process, and the Bernoullli error matrix $\tilde{E}_i$. That is, the device 102*a* computes $AS_i + \tilde{E}_i$ and then computes the difference between the modified LPN instance $\gamma_i$ and $AS_i + \tilde{E}_i$, as given by Eq. (9) below:

$$\gamma_i - (AS_i + \tilde{E}_i) = AS + E_i^* \bmod p_i. \tag{9}$$

where $p_i$ is the prime number the device used to generate $E_i$. During stage (E) of the example key sharing process, the device 102*a* recovers the secret key by solving the right-hand side of Eq. (9). Due to the small Hamming weight and low Euclidean and infinity norms of $E_i^*$, the device can use any decoding algorithm to recover the secret key S.

In some implementations the device 102*a* can also verify the recovered secret key. For example, the device 102*a* can verify that the secret key is singular, i.e., that the determinant of the secret key is equal to zero. The number of singular matrices is small-compared to the general space of all matrices-modulo any large integer m. Specifically, the number of singular matrices is $(m-1)^{n^2} - \Pi_{i=0}^{n-1}((m-1)^n - (m-1)^i)$. This value approaches zero quickly with increasing value of m. Therefore, randomly sampled matrices are unlikely to be singular especially because the combiner does not have any information on m.

As another example, the device 102*a* can verify that the greatest common divisor of ξ and $\phi(p_i)$ is $q_i$. This follows from the generation of ξ and the structure of safe primes. The probability of the combiner 106 cheating this verification is given by the random chance of generating ξ such that its greatest common divisor is $q_i$ for all $\phi(p_i)$. Since the safe primes generated by honest parties are sufficiently large to avoid guessing or brute-force attacks, this chance comes out to be less than $(\ln \bar{p})^{-r}$, where $\bar{p}$ represents the largest element of £ and ln is the natural log.

Therefore, the device 102*a* can perform two verification checks of the behavior of the combiner 106 and, since $p_i$ or any composite with $p_i$ as a factor is never revealed, even a quantum combiner cannot cheat on both verifications with non-negligible probability.

The presently described protocol for sharing the secret key is optimal since it only requires sending one message to each device. Moreover, similar to the offline key generation process described above with reference to FIG. 3, the key sharing process does not require encrypted or protected channels and is post-quantum secure.

Figure 5:
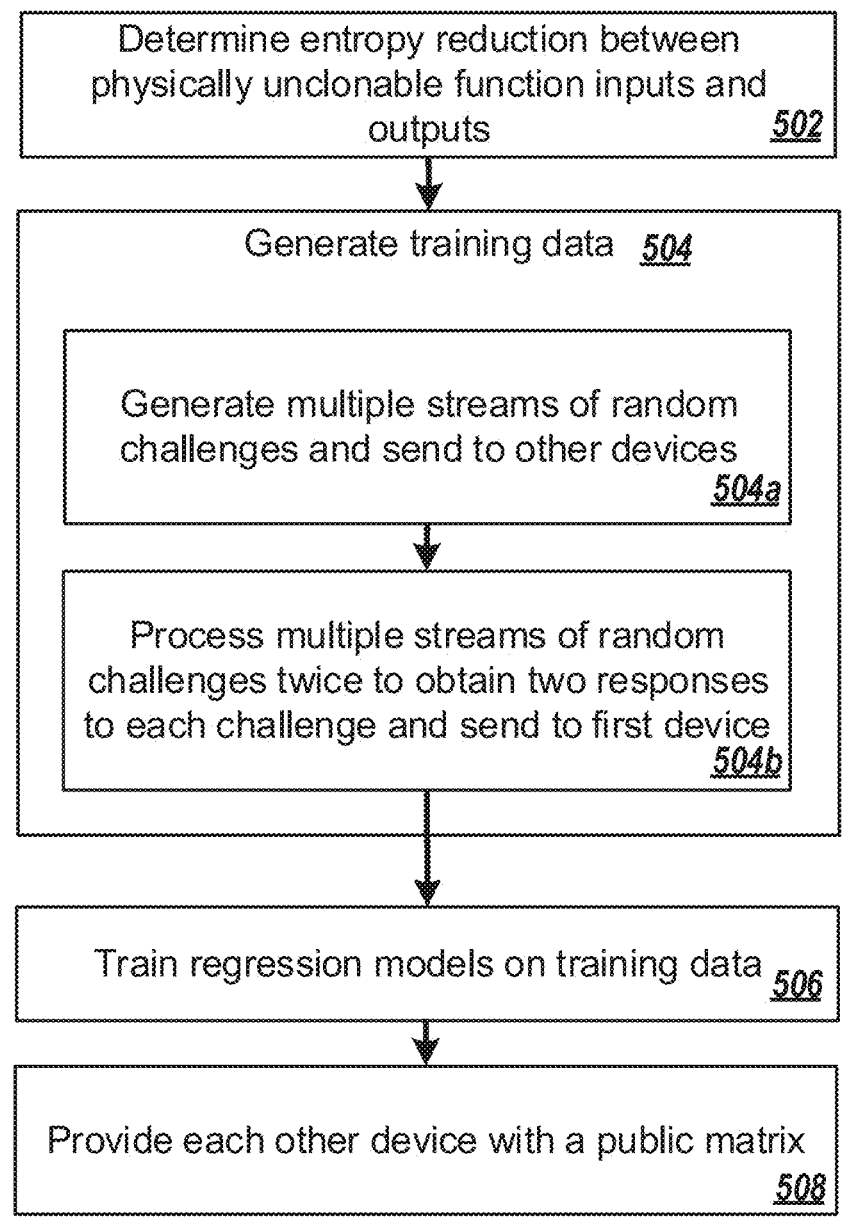
FIG. 5 is a flowchart of an example process for online setup of a key generation system.

FIG. 5 is a flowchart of an example process 500 for online setup of a key generation system. For convenience, the process 500 will be described as being performed by a system of one or more computers located in one or more locations. For example, the example key generation system 100 of FIG. 1, appropriately programmed, can perform example process 500. Although the flowchart depicts the various stages of the process 500 occurring in a particular order, certain stages may, in some implementations, be performed in parallel or in a different order than what is depicted in the example process 500 of FIG. 5.

The system obtains information that specifies the entropy reduction between an input and corresponding output of each PUF included in the system (step 502). For example, a first device included in the system can obtain the information for the PUFs included in multiple other devices in the system. The system uses this information to generate streams of random challenges that satisfy a predetermined acceptable entropy, as described above with reference to FIG. 2.

The system generates training data (step 504). The first device generates multiple streams of random challenges (e.g., using a pseudorandom generator), and sends the multiple streams of random challenges to each device of the multiple other devices (step 504*a*). Each stream of random challenges in the multiple streams of random challenges includes a predetermined proportion of meta-stable challenge bits to ensure that the predetermined acceptable entropy described above is satisfied. In some implementations the streams of random challenges each include an equal number of meta-challenges.

In response, each device processes the multiple streams of random challenges twice using its PUF to obtain two responses to each challenge in the multiple streams of random challenges. Each device sends results of the processing (e.g., data representing the two responses to each challenge in the multiple streams of random challenges) to the first device (step 504*b*). Triples that specify a respective challenge in the multiple streams of random challenges and two responses generated by a respective device's PUF forms the training data.

The first device trains two regression models on the training data (step 506). The training of the two regression models is described above with reference to FIG. 2.

The first device sends a public matrix to each device in the multiple of other devices (step 508). Each device stores the public matrix for use in a future offline key generation process, as described in more detail below with reference to FIG. 6.

Figure 6:
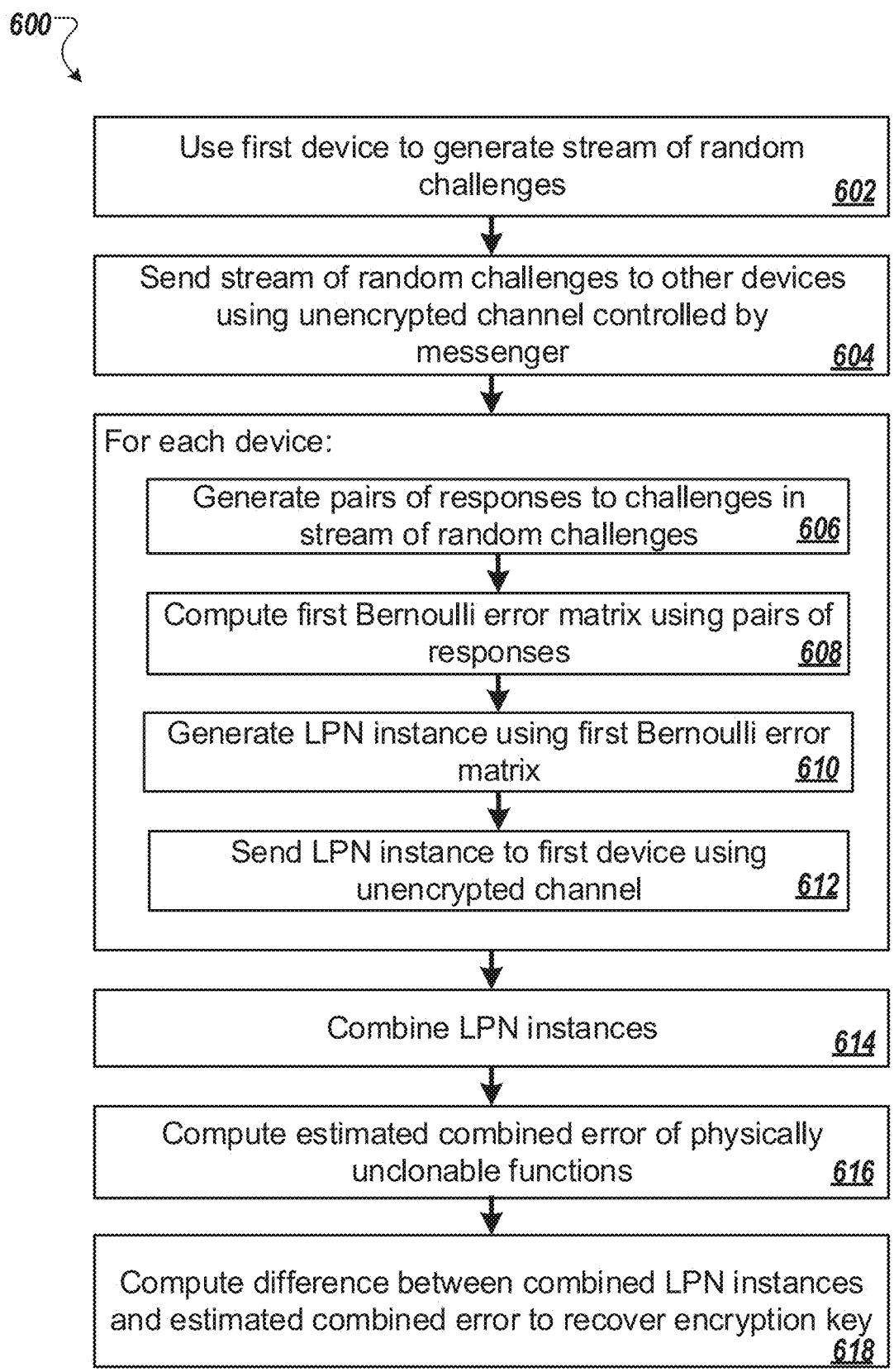
FIG. 6 is a flowchart of an example process for generating an encryption key.

FIG. 6 is a flowchart of an example process 600 for generating a secret encryption key. For convenience, the process 600 will be described as being performed by a system of one or more computers located in one or more locations. For example, the example key generation system 100 of FIG. 1, appropriately programmed, can perform example process 600. Although the flowchart depicts the various stages of the process 600 occurring in a particular order, certain stages may, in some implementations, be performed in parallel or in a different order than what is depicted in the example process 600 of FIG. 6.

A first device included in the system generates a stream of random challenges (step 602). For example, the first device can use a PUF (e.g., strong implicit PUF) or a pseudorandom generator to generate the stream of challenges. The stream of random challenges can include both highly-stable and meta-stable challenges. The stream of random challenges can be generated such that the entropy of the output of the stream of random challenges and a TCL for the stream of random challenges satisfy predefined levels (e.g., the TCL (measured in bits) can be adjusted so that the entropy of the challenge output remains higher than a predefined acceptable level, such as 0.9).

The first device sends the stream of random challenges to multiple other devices included in the system (step 604). In some implementations, the system can be part of an offline cold storage system that implements distributed cryptographic protocols among multiple offline nodes. In some implementations, the first device and multiple other devices can be offline devices that communicate through a physical messenger. For example, the first device can send the stream of random challenges to the other devices using an unencrypted channel that is controlled by the messenger. In some implementations, the messenger can be malicious (e.g., the messenger could collude with b devices of the multiple other devices, where b is strictly less than the total number of devices included in the system).

In response to receiving the stream of random challenges, each device performs the following operations. The device processes the stream of random challenges twice using a PUF to obtain pairs of responses to the challenges in the stream of random challenges (step 606). The device computes a first Bernoulli error matrix using the generated pairs of responses to the challenges in the stream of random challenges (step 608). For example, for each prime number in a set of prime numbers generated by the device during an online setup process, and for a j-th challenge in the stream of random challenges, computing a difference between the pair of responses to the j-th challenge in the stream of random challenges modulo the prime number. The device uses a pre-stored public matrix (that is common to each device), a partial secret encryption key generated by the device, and the first Bernoulli error matrix to generate a first LPN instance (step 610). For example, the device can multiply the public matrix by the partial secret encryption key, then add the first Bernoulli error vector, as defined in Eq. (2) above. In some implementations, the device can generate the partial secret encryption key using=a set of prime numbers generated by the device during an online setup process and a parameter known to each of the plurality of other devices. The device sends the first LPN instance to the first device using the messenger (e.g., using the unencrypted channel controlled by the messenger) (step 612).

In response to receiving the first LPN instances from the multiple other devices, the first device combines at least a threshold number of the first LPN instances (e.g., according to Eq. (3) above) (step 614). The first device also computes an estimated combined error of the physically unclonable functions included in the multiple other devices (step 616). To compute the estimated combined error of the physically unclonable functions included in the multiple other devices, the first device can process the stream of random challenges generated at step 602 using two pre-trained regression models to obtain two streams of predicted outputs for the random challenges. The regression models have been trained to fit CRPs obtained using the PUFs included in the other devices as a linear function, as described above with reference to FIG. 6. The first device can use the outputs of the model (i.e., the streams of predicted outputs) to compute the estimated combined error of the PUFs included in the multiple other devices as a difference between the two streams of predicted outputs.

The first device computes a difference between the combined threshold number of first LPN instances and the estimated combined error of the PUFs included in the multiple other devices to recover a summation of each partial secret encryption key encoded in the threshold number of first LPN instances (step 618). The summation of each partial secret encryption key is used as the secret encryption key. That is, the system solves Eq. (4) and (5) above for the summation of each partial secret encryption key, e.g., using a trapdoor inversion algorithm.

In some implementations the first device can verify the recovered encryption key. For example, the first device can compute a modulo of the encryption key with respect to a value r−1, wherein r represents a sum of sizes of sets of prime numbers generated by the plurality of other devices during an online setup process, and determine that a determinant of the modulo of the encryption key with respect to a value r−1 is equal to zero, as described above with reference to FIG. 3.

Figure 7:
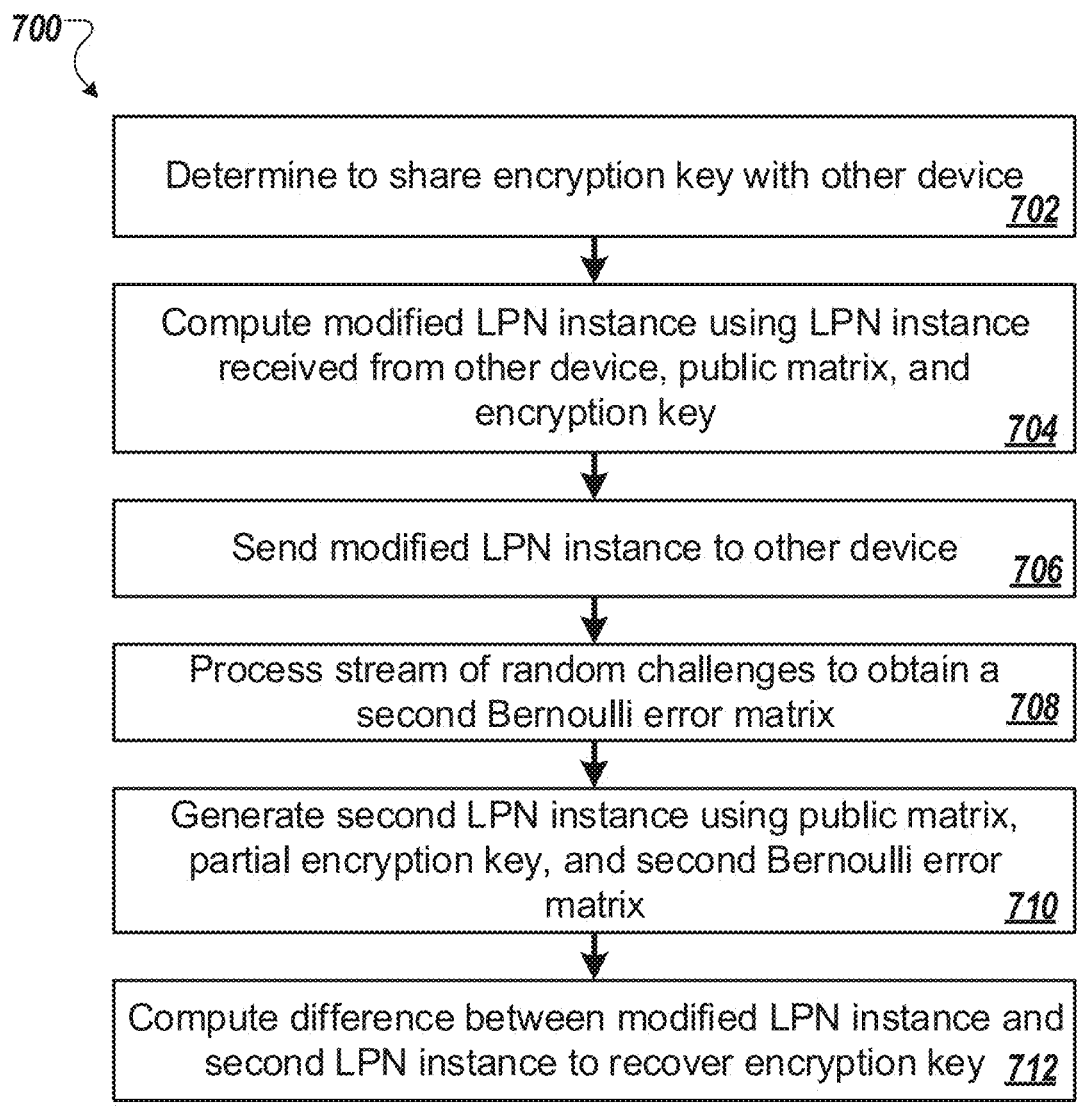
FIG. 7 is a flowchart of an example process for sharing an encryption key.

FIG. 7 is a flowchart of an example process 700 for sharing a secret encryption key (e.g., an encryption key generated according to example process 600 of FIG. 6). For convenience, the process 700 will be described as being performed by the same system as example process 600. That is, the example key generation system 100 of FIG. 1, appropriately programmed, can perform example process 700. Although the flowchart depicts the various stages of the process 700 occurring in a particular order, certain stages may in some implementations be performed in parallel or in a different order than what is depicted in the example process 700 of FIG. 7.

The first device determines to share the secret encryption key with another device of the multiple other devices (step 702). For example, the first device can receive a request to share the secret encryption key from the other device. In response, the first device computes a modified LPN instance using the first LPN instance received from the other device (e.g., received and stored at step 612 of example process 600), the public matrix (e.g., generated and stored by the first device during example process 500), and the secret encryption key (step 704). That is, the first device computes a modified LPN instance according to Eq. (7) above. The first device sends the modified LPN instance to the other device (e.g., using the unencrypted channel controlled by the messenger) (step 706).

Meanwhile, the other device processes the stream of random challenges received at step 502 of example process 500 twice to obtain a second Bernoulli error matrix (step 708). Step 708 is similar to steps 606 and 608 of example process 600. The other device then generates a second LPN instance using the pre-stored public matrix, the partial secret encryption key, and the second Bernoulli error matrix (step 710). Step 710 is similar to step 610 of example process 600. In response to receiving the modified LPN instance from the first device, the other device then computes a difference between the modified LPN instance and the second LPN instance to recover the secret encryption key (step 712). Step 712 is similar to step 618 of example process 600.

In some implementations the other device can verify the recovered secret encryption key, e.g., by performing one or both of the verification checks described above with reference to FIG. 4.

This specification uses the term "configured" in connection with systems and computer program components. For a system of one or more computers to be configured to perform particular operations or actions means that the system has installed thereon software, firmware, hardware, or a combination thereof that, in operation, cause the system to perform the operations or actions. For one or more computer programs to be configured to perform particular operations or actions means that the one or more programs include instructions that, when executed by data processing apparatus, cause the apparatus to perform the operations or actions.

Implementations of the subject matter and the functional operations described in this specification can be realized in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs (i.e., one or more modules of computer program instructions) encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. The program instructions can be encoded on an artificially-generated propagated signal (e.g., a machine-generated electrical, optical, or electromagnetic signal) that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry (e.g., an FPGA (field programmable gate array) or an ASIC (application-specific integrated circuit)). The apparatus can optionally include, in addition to hardware, code that creates an execution environment for computer programs (e.g., code) that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data (e.g., one or more scripts stored in a markup language document) in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry (e.g., a FPGA, an ASIC), or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device (e.g., a mobile telephone, a personal digital assistant (PDA), a mobile audio or video player, a game console, a Global Positioning System (GPS) receiver), or a portable storage device (e.g., a universal serial bus (USB) flash drive) to name just a few.

Computer-readable media suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks.

To provide for interaction with a user, implementations of the subject matter described in this specification can be provisioned on a computer having a display device (e.g., a CRT (cathode ray tube) or LCD (liquid crystal display) monitor) for displaying information to the user and a keyboard and a pointing device (e.g., a mouse, a trackball), by which the user can provide input to the computer. Other kinds of devices can be used to provide for interaction with a user as well; for example, feedback provided to the user can be any form of sensory feedback (e.g., visual feedback, auditory feedback, tactile feedback); and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device (e.g., a smartphone that is running a messaging application), and receiving responsive messages from the user in return.

Implementations of the subject matter described in this specification can be realized in a computing system that includes a back-end component (e.g., as a data server) a middleware component (e.g., an application server), and/or a front-end component (e.g., a client computer having a graphical user interface, a web browser, or an app through which a user can interact with implementations of the subject matter described in this specification, or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a user device (e.g., for purposes of displaying data to and receiving user input from a user interacting with the device), which acts as a client. Data generated at the user device (e.g., a result of the user interaction) can be received at the server from the device.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method for generating an encryption key, the method comprising:
   generating, by a first device, a stream of random challenges;
   sending, from the first device, the stream of random challenges to a plurality of other devices, each device of the plurality of other devices:
      processing, by a physically unclonable function (PUF), the stream of random challenges to obtain pairs of responses, and
      generating a first learning parity with noise (LPN) instance using a pre-stored public matrix, a partial encryption key generated by the device, and a first error matrix;
   receiving, by the first device, first LPN instances from the plurality of other devices;
   combining, by the first device, a plurality of the first LPN instances to provide combined first LPN instances;
   computing an estimated combined error of PUFs included in the plurality of other devices; and
   generating, by the first device, the encryption key, comprising computing a difference between the combined first LPN instances and the estimated combined error to recover a summation of each partial encryption key encoded in the combined first LPN instances.

2. The method of claim 1, wherein the first device and plurality of other devices comprise offline devices.

3. The method of claim 1, wherein:
   the stream of random challenges is sent from the first device to the plurality of other devices through an unencrypted channel;
   the first LPN instances are sent to the first device from each device of the plurality of other devices through the unencrypted channel; and
   the unencrypted channel is controlled by a messenger.

4. The method of claim 3, wherein the messenger comprises a malicious messenger that colludes with $k$ devices of the plurality of other devices, wherein $k$ is strictly less than a total number of devices.

5. The method of claim 1, wherein computing the first error matrix comprises, for each prime number in a set of prime numbers generated by the first device during an online setup process, and for a j-th challenge in the stream of random challenges, computing a difference between a pair of responses to the j-th challenge in the stream of random challenges modulo the prime number.

6. The method of claim 1, wherein generating the first LPN instance comprises multiplying the public matrix by the partial encryption key and adding the first error matrix.

7. The method of claim 1, further comprising generating, by the first device, the partial encryption key using a set of prime numbers generated by the first device during an online setup process and a parameter known to each of the plurality of other devices.

8. The method of claim 1, wherein computing the estimated combined error of the PUFs included in the plurality of other devices comprises:
   providing the stream of random challenges as input to each of two regression models to obtain two streams of predicted outputs for the stream of random challenges, wherein each of the two regression models have been trained on training data during an online setup process to fit challenge-response pairs obtained using the PUFs included in the plurality of other devices as a linear function; and
   computing the estimated combined error of the PUFs included in the plurality of other devices as a difference between the two streams of predicted outputs.

9. The method of claim 8, further comprising implementing the online setup process, comprising:
   generating the training data, comprising:
      generating, by the first device, multiple streams of random challenges,
      sending, by the first device, the multiple streams of random challenges to the plurality of other devices,
      processing, by each device of the plurality of other devices, the multiple streams of random challenges twice using the physically unclonable function included in the device to obtain two responses to each challenge in the multiple streams of random challenges, and
      providing, by each device of the plurality of other devices and to the first device, the two responses to each challenge in the multiple streams of random challenges as training data; and
   training, by the first device, the two regression models on the training data.

10. The method of claim 9, further comprising sending, from the first device, the public matrix to each device in the plurality of other devices, wherein each device of the plurality of other devices stores the public matrix.

11. The method of claim 9, wherein one or more of:
generating the multiple streams of random challenges comprises using a pseudorandom generator included in the first device;
each stream of random challenges in the multiple streams of random challenges comprises a predetermined proportion of meta-stable challenge bits; or
the streams of random challenges comprise an equal number of meta-challenges.

12. The method of claim 1, wherein recovering the summation of each partial encryption key encoded in the combined first LPN instances comprises performing a trapdoor inversion algorithm.

13. The method of claim 1, further comprising:
determining, by the first device, to share the encryption key with another device in the plurality of other devices;
computing, by the first device, a modified LPN instance using the first LPN instance received from the other device, the public matrix, and the encryption key;
sending, by the first device, the modified LPN instance to the other device;
processing, by the PUF included in the other device, the stream of random challenges twice to obtain a second error matrix;
generating a second LPN instance using the public matrix, the partial encryption key, and the second error matrix; and
computing a difference between the modified LPN instance and the second LPN instance to recover the encryption key.

14. The method of claim 13, wherein a difference between the first error matrix and the second error matrix has a Hamming weight that is below a threshold.

15. The method of claim 13, further comprising verifying the recovered encryption key, the verifying comprising one or more of:
verifying that the recovered encryption key is singular; or
verifying that the recovered encryption key was generated using inputs from the first device.

16. The method of claim 1, wherein one or more of:
generating the stream of random challenges comprises using a first device PUF or a pseudorandom generator;
the stream of random challenges comprises highly-stable and meta-stable challenges; and
an entropy of an output of the stream of random challenges and a threshold challenge length for the stream of random challenges satisfy predefined levels.

17. The method of claim 1, wherein the PUFs included in the plurality of other devices comprise strong implicit PUFs.

18. The method of claim 1, further comprising verifying the encryption key, comprising:
computing a modulo of the encryption key with respect to a value r−1, wherein r represents a sum of sizes of sets of prime numbers generated by the plurality of other devices during an online setup process; and
determining that a determinant of the modulo of the encryption key with respect to a value r−1 is equal to zero.

19. A system comprising one or more computers and one or more storage devices storing instructions that are operable, when executed by the one or more computers, to cause the one or more computers to perform operations for generating an encryption key, the operations comprising:
generating, by a first device, a stream of random challenges;
sending, from the first device, the stream of random challenges to a plurality of other devices, each device of the plurality of other devices:
processing, by a physically unclonable function (PUF), the stream of random challenges to obtain pairs of responses, and
generating a first learning parity with noise (LPN) instance using a pre-stored public matrix, a partial encryption key generated by the device, and a first error matrix;
receiving, by the first device, first LPN instances from the plurality of other devices;
combining, by the first device, a plurality of the first LPN instances to provide combined first LPN instances;
computing an estimated combined error of PUFs included in the plurality of other devices; and
generating, by the first device, the encryption key, comprising computing a difference between the combined first LPN instances and the estimated combined error to recover a summation of each partial encryption key encoded in the combined first LPN instances.

20. A non-transitory computer-readable storage medium comprising instructions stored thereon that are executable by a processing device and upon such execution cause the processing device to perform operations for generating an encryption key, the operations comprising:
generating, by a first device, a stream of random challenges;
sending, from the first device, the stream of random challenges to a plurality of other devices, each device of the plurality of other devices:
processing, by a physically unclonable function (PUF), the stream of random challenges to obtain pairs of responses, and
generating a first learning parity with noise (LPN) instance using a pre-stored public matrix, a partial encryption key generated by the device, and a first error matrix;
receiving, by the first device, first LPN instances from the plurality of other devices;
combining, by the first device, a plurality of the first LPN instances to provide combined first LPN instances;
computing an estimated combined error of PUFs included in the plurality of other devices; and
generating, by the first device, the encryption key, comprising computing a difference between the combined first LPN instances and the estimated combined error to recover a summation of each partial encryption key encoded in the combined first LPN instances.

* * * * *